May 1, 1934. C. H. TATE 1,956,911
MACHINE FOR CUTTING ELONGATED SLOTS
Filed Nov. 2, 1932 3 Sheets-Sheet 1

Charles H. Tate,
INVENTOR.

BY J. Stanley Burch
ATTORNEY.

Charles H. Tate,
INVENTOR.

May 1, 1934. C. H. TATE 1,956,911
MACHINE FOR CUTTING ELONGATED SLOTS
Filed Nov. 2, 1932 3 Sheets-Sheet 3

Charles H. Tate,
INVENTOR.
BY J. Stanley Burch
ATTORNEY.

Patented May 1, 1934

1,956,911

UNITED STATES PATENT OFFICE 1,956,911

MACHINE FOR CUTTING ELONGATED SLOTS

Charles H. Tate, Anacortes, Wash.

Application November 2, 1932, Serial No. 640,888

13 Claims. (Cl. 144—136)

This invention relates to a machine for cutting elongated slots or holes in boards, and, while capable of general use for cutting slots in boards for various purposes, it is particularly useful for cutting elongated hand holes in box ends and the like.

The primary object of the present invention is to provide a machine of the above kind which is entirely automatic in operation except for properly providing a supply of boards to be operated upon, and which will accordingly require a minimum amount of work and attention on the part of the operator.

A more specific object of the present invention is to provide a machine of the above kind which may be readily adjusted to cut slots in boards of any desired size or length and at any desired location.

A still further object of the present invention is to provide a machine of the above kind which is comparatively simple in construction, efficient in use, and otherwise adapted to meet with all of the requirements for a successful commercial use.

Briefly described, the present invention contemplates generally the provision of a machine of the above kind having a rotary cutter bit, means to initially feed successive boards into position to be entered by the cutter bit to initially form a round hole therein and, after an interval, to move the boards relative to the cutter bit whereby the hole is elongated by the latter, and means to automatically cause the cutter bit to enter the boards during such interval and to withdraw therefrom when the final feeding movement of the board is completed and the hole is properly elongated.

Other objects and features of the invention will become apparent from the following description when considered in connection with the accompanying drawings, in which:

Figure 1 is a rear elevational view of a machine embodying the present invention, partly broken away and in section.

Figure 2 is a top plan view thereof.

Figure 5:
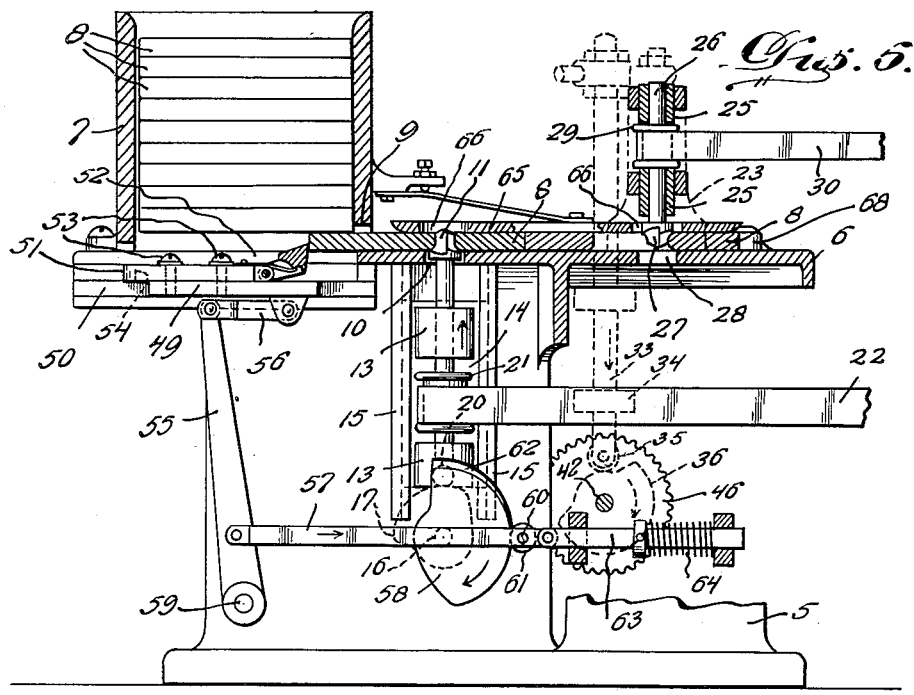
Figure 6:
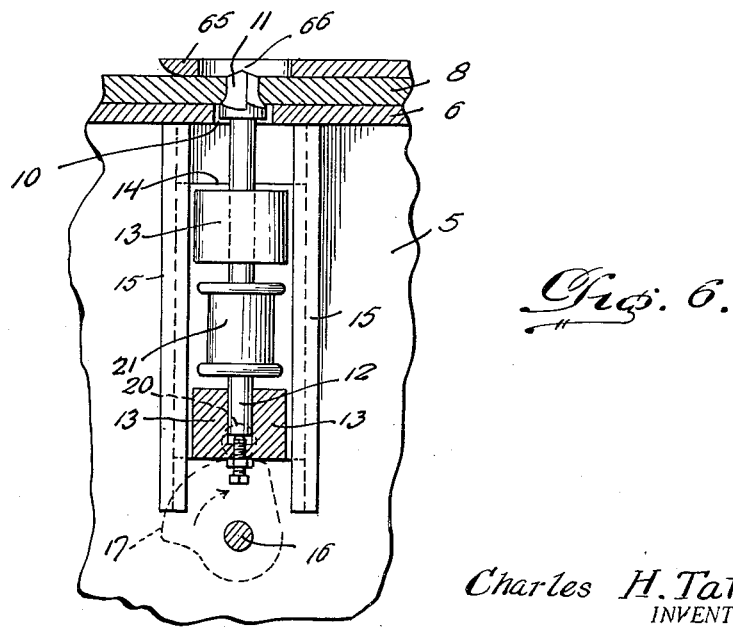

Figure 5 is a detail view of the machine partly in elevation and partly in vertical longitudinal section; and Figure 6 is an enlarged fragmentary vertical section showing the initial slot cutting bit and adjacent parts more in detail.

Referring more in detail to the drawings, the present machine includes a suitable frame 5 provided at the top with an elongated table or horizontal platform 6 above one end of which is suitably mounted a hopper 7 to receive in superimposed or stacked relation a number of the boards 8 to be slotted. It will be understood that this hopper is open at the bottom so that the boards will lower by gravity to successively rest flatly upon the adjacent end of the table 6. Also, the inner wall of the hopper 7 is cut away at the bottom as at 9 to leave sufficient room between the same and the table 6 for passage of the lowermost board from the hopper along and toward the opposite end of the table.

Provided in the table 6 adjacent the inner side of hopper 7 is an opening 10 through which is movable a rotary cutter bit 11 detachably carried by the upper end of a vertical shaft 12 that is journaled in spaced bearings 13 carried by a plate 14. The plate 14 is vertically slidable in suitable guideways 15 provided on the frame 5 beneath the table 6. Journaled in the frame 5 directly beneath the plate 14 is a transverse horizontal shaft 16 on which is secured a cam 17, and rigid with the plate 14 is a lateral pin 18 slidably guided in a vertical elongated slot 19 of frame 5 and provided on its free end with a roller 20 arranged to ride on the peripheral edge of cam 17. It will be noted that when shaft 16 is rotated, cam 17 will be rotated therewith, and through the medium of pin 18 and roller 20, the plate 14 will be intermittently raised and then permitted to lower, the shape of cam 17 being such as to maintain the plate 14 elevated for a short period of time and to permit the same to remain in lowered position for a short period of time. Naturally, this same operation takes place with respect to the cutter bit 11 mounted on and movable with plate 14. Power may be transmitted to shaft 12 for rotating the same and cutter bit 11, by any suitable means, such as pulley 21 secured on shaft 12 between bearings 13 and belt 22 passing around such pulley.

Figure 1:
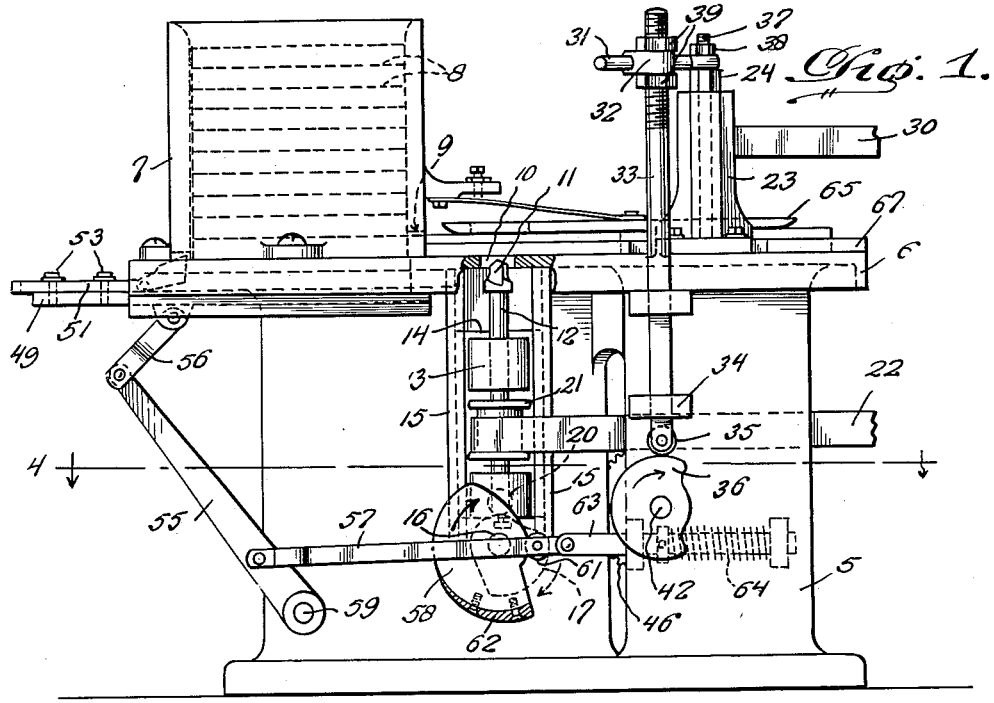
Figure 2:
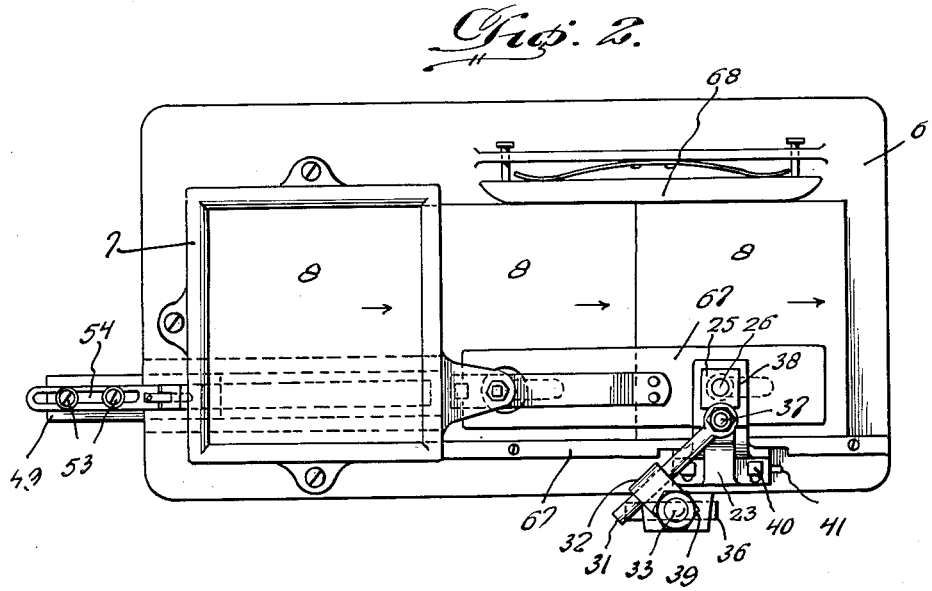
Figure 3:
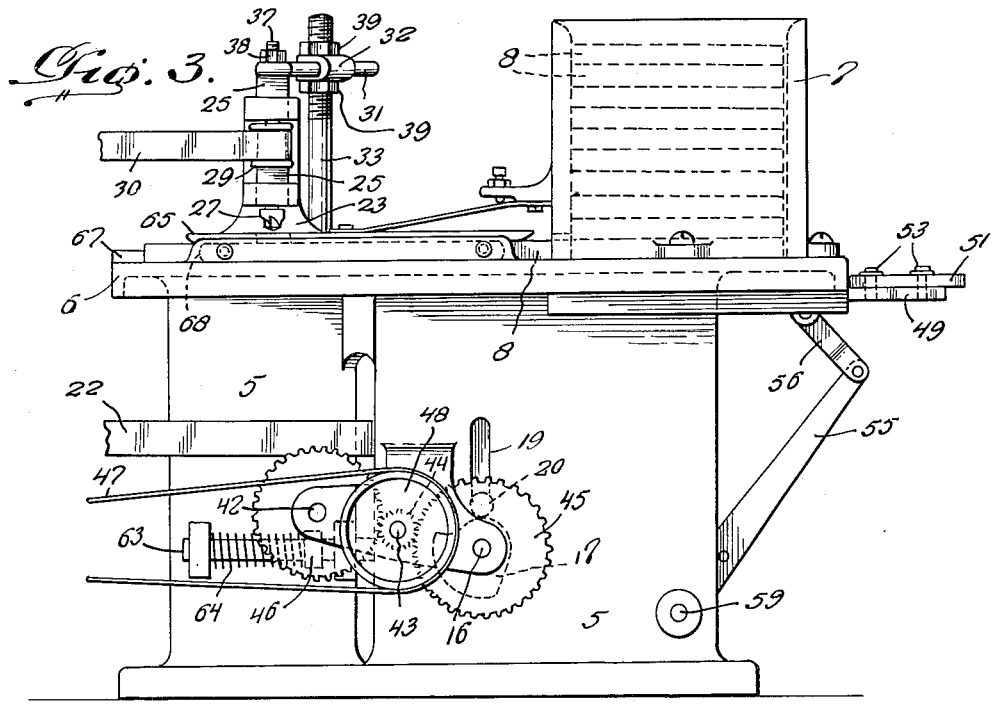
Figure 3 is a front elevational view of the same.
Figure 4:
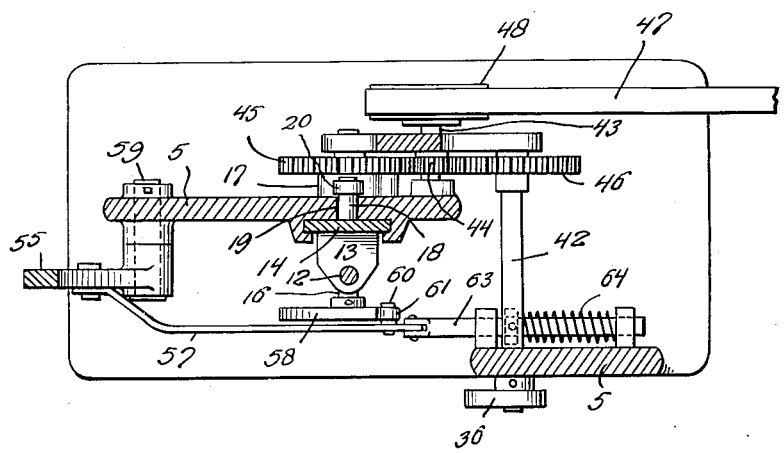
Figure 4 is a horizontal section on line 4—4 of Figure 1.

In the embodiment of the invention illustrated, a standard 23 is mounted on the table 6 adjacent its rear edge and near the end opposite that at which the hopper 7 is located. Vertically slidable in standard 23 is a bar 24 having a pair of spaced bearings 25 in which is journaled a vertical shaft 26 carrying a detachable cutter bit 27 at its lower end. The shaft 26 is thus rotatable in bearings 25 and movable with the latter vertically. Also, it will be noted that shaft 26 and cutter bit 27 and shaft 12 and cutter bit 11 are in the same vertical plane longitudinally of table 6. The cutter bit 27 is vertically alined with an opening 28 provided in the adjacent end of table 6, and power may be applied to shaft 26 for rotating the same and cutter bit 27, by any suitable means, such as a pulley 29 secured on shaft 26 between bearings 25 and having a belt 30 passsing therearound. Rigid with the upper end of bar 24 is a horizontal arm 31 that slidably extends through a split clamping sleeve 32 mounted for vertical adjustment on the upper end of a vertically movable push rod 33 mounted in guides 34 on frame 5 and provided at its lower end with a roller 35 arranged to ride on the periphery of a cam 36. More specifically, the arm 31 is pivotally engaged with an upstanding stem 37 of bar 24 for horizontal swinging adjustment relative to the latter, and threaded on stem 37 is a nut 38 by means of which arm 31 may be rigidly secured in the desired horizontally swung adjusted position relative to bar 24. Further, the upper end of push rod 33 is threaded and has locking nuts 39 threaded thereon against opposite sides of clamping sleeve 32. By loosening nuts 39, arm 31 may be permitted to slide through clamping sleeve 32, and sleeve 32 may be rotarily adjusted to a desired angular relation with respect to push rod 33, after which the parts may be secured in adjusted position by tightening nuts 39. This relative adjustment of these parts is necessary because standard 23 is adjustable longitudinally of table 6 toward and from cutter bit 11. As bar 24 and push rod 33 are in different vertical planes transversely of table 6, it will be seen that adjustment of standard 23 relative to cutter bit 11 longitudinally of table 6 will necessitate a change in the angular relation of arm 31 relative to bar 24, a similar change in clamping sleeve 32 relative to push rod 33, and sliding adjustment of arm 31 through clamping sleeve 32. The necessary change in the relation of these parts is permitted by loosening nuts 38 and 39, after which the nuts are tightened to maintain the desired adjustment. The purpose of adjusting standard 23 longitudinally of table 6 so as to vary the distance between cutter bits 11 and 27, will later become apparent. This adjustment may be permitted by bolting the standard 23 on table 6 as at 40, the bolts passing through longitudinal elongated slots 41 in table 6 as shown more clearly in Figure 2.

Cam 36 is secured on a transverse horizontal shaft 42 journaled in frame 5, and it will be seen that when shaft 42 is rotated, cam 36 will cause push rod 33 to be raised along with bit 27 and the other associated parts movable therewith, maintaining these parts elevated for a period of time and then allowing them to lower and to remain in the lowered position for a predetermined period of time. A drive shaft 43 is suitably journaled in the frame 5 between adjacent ends of shafts 16 and 42, and this power shaft 43 carries a small spur gear 44 which meshes with similar larger gears 45 and 46 respectively secured on shafts 16 and 42. Obviously, power is thus simultaneously transmitted from shaft 43 to shafts 16 and 42 when shaft 43 is driven, and driving of shaft 43 may be accomplished from any suitable source of power by means of a belt 47 passing around a pulley 48 on drive shaft 43.

For the purpose of automatically and successively feeding the boards 8 from hopper 7 into position to be operated upon by cutter bits 11 and 27, and for feeding the boards relative to said cutter bits for elongating the holes in such boards, I preferably make use of what is known in other types of machines as an adjustable kicker. This adjustable kicker or feeding device consists of an elongated plate 49 slidable in horizontal guides 50 provided on the upper side of table 6 beneath the hopper 7, and a board-engaging dog or element 51 mounted on plate 49 as well as movable in and projecting upwardly through an elongated longitudinal slot 52 in the adjacent end of table 6. The board-engaging element or dog 51 is adjustable relative to plate 49 longitudinally of table 6 for a purpose which will later become apparent, such adjustment being had by bolting the element 51 to plate 49 as at 53 and by providing an elongated slot in element 51 through which the bolts pass as at 54. For reciprocating the plate 49 and the board-engaging element 51 carried thereby, plate 49 is connected to the upper end of a vertical swinging lever 55 by means of a link 56, and lever 55 is actuated by means of a pitman 57 and a cam 58 mounted on shaft 16. As shown, lever 56 is pivoted at its lower end on the frame of the machine as at 59, and one end of pitman 57 is pivoted to lever 55 intermediate its ends, lever 57 being provided near its other end with a laterally projecting pin 60 carrying a roller 61 arranged to ride on the periphery of cam 58. Cam 58 is of such form as to initially pull pitman 57 to the right of Figure 5 so that the lowermost board in hopper 7 which is engaged at its left-hand edge by the element or dog 51 will be fed a predetermined distance from the hopper 7 along the table 6 into position to be operated upon by the bit 11. Upon continued rotation of cam 58, the feeding device will be at rest for a period of time, and during this period cam 17 will operate to elevate cutter bit 11 through opening 10, and to then enter the board for forming a circular opening therein. As the rotation of cam 58 continues further, the portion 62 thereof will actuate pitman 57 and the remaining parts of the feeding device so as to cause the board to be fed relative to cutter bit 11 for a further distance in a direction away from hopper 7, while bit 11 continues to be held raised. In this way the circular opening initially formed in the board is elongated, the length of the opening or slot so formed depending upon the distance at which the board is moved in this final feeding movement. As soon as this final feeding movement is completed, the part 62 of cam 58 will leave roller 61 and the pitman 57 will be permitted to move to the left so as to return the board-feeding dog 51 to its initial or starting position to the left of the boards in the hopper 7. Obviously, when the dog or element 51 is thus returned, it will be in position to engage the left-hand edge of the next succeeding board which has lowered in the hopper 7 onto the table 6. Simultaneously with return of the element 51 to the start of its feeding position, cam 17 will release from roller 20 so as to allow cutter bit 11 to lower below the surface of table 6 out of the slot formed in the board as described above, and by this time the cam 58 has moved to a point where it again actuates the board-engaging element 51 for moving the succeeding board into position for being operated upon by cutter bit 11. As such succeeding board contacts at its right-hand edge with the left-hand edge of the preceding board, such preceding board will be further fed along the table 6 thereby. It is here noted that the portion 62 of cam 58 is detachable so that similar portions of varying taper and thickness may be substituted therefor whenever a change in the length of slots produced by the machine is desired. Obviously, if a part 62 is substituted which tapers to a thicker larger end, a greater feeding movement will be imparted to the boards while being operated upon by the cutter bit 11, thereby resulting in a longer slot being formed. Further, the adjustment of board-engaging element 51 relative to plate 49 will govern the distance at which the board is fed from the hopper in the initial feeding movement, thereby permitting the operator to vary the point at which the formation of the slot in the board is begun. As the bit 11 is removable, cutter bits of various sizes may be used, and it will thus be seen that provision is made whereby the machine may be readily adapted for the formation of slots of varying lengths, sizes and location.

The bit 11 is preferably of a shape so as to cause the under or outer side of the slot or hole to be rounded, particularly when cutting hand holes in box ends. When it is not desired to round the edges of the holes in the boards, or when it is desired to only round the outer edges thereof, use of the cutter bit 27 may be dispensed with. Accordingly, it will be apparent that the cutter bit 27 is only used when it is desired to round the upper or inner edges of the slots or openings formed in the board by the previous operation of cutter bit 11. When the cutter bit 27 is in use, each board after being slotted by bit 11 will be fed by the succeeding board into position to be operated upon by said cutter bit 27. In such case, the cam 36 will permit the cutter bit 27 to lower into engagement with the adjacent board simultaneously with the elevation of bit 11 into engagement with the succeeding board by means of cam 17. Therefore, the board in position to be operated upon by bit 27 will be fed along so as to have the inner edges of its slot rounded by bit 27 as the slot is being cut in the succeeding board by bit 11. Cam 36 will then elevate bit 27 when bit 11 is allowed to lower so that the board which has just been operated upon by bit 27 will be discharged from the machine, so that the board which has just been slotted by bit 11 will be fed into position to be operated upon by bit 27, and so that a new board may be fed into position for being operated upon by cutter 11. Any suitable means may be provided for handling or receiving the boards as they are discharged from the machine after being finally operated upon by cutter bit 27.

The lever 55 and other parts of the board feeding mechanism are preferably returned to the left of Figure 5 to their normal or initial position by spring means. For purposes of illustration only, this means is shown as embodying a horizontally slidable rod 63 mounted on the frame of the machine and connected to the right-hand end of pitman 57 as seen in Figure 5, rod 63 being yieldingly pressed to the left of Figure 5 by means of spring 64.

A suitable spring-pressed presser plate 65 is suitably mounted above the table 6 in position to yieldingly bear upon the boards and firmly hold them down upon the table 6 as they are fed along the latter and as they are operated upon by the bits 11 and 27 while stationary. This presser plate 65 has openings as at 66 in registry with the cutter bits 11 and 27 so as to not interfere with the operation of said cutter bits.

Assuming that the machine is conditioned to form slots in boards of a given length, the bit 27 will obviously be arranged a definite distance from bit 11 so that bit 27 will enter the slots of the boards at the same point where formation of such slots was begun by bit 11. Assuming, however, that the length of slot is changed by a change in the character of cam part 62 and a change in the adjustment of board-engaging element 51, or both, the relation of bit 27 to bit 11 must be varied. It is for this purpose that standard 23 is adjustable longitudinally of table 6 and relative to bit 11 so that the distance between the two bits may be adjusted in accordance with the location and size of slot selected to be formed in the boards.

It will be noted that a guide strip 67 is provided on the table 6 near its rear edge and from the inner side of hopper 7 to the discharge end of the table. The boards are fed from the hopper with their rear edges in contact with this guide strip, whereby the boards are effectively guided in their movement along the top of table 6 so as to travel in a straight path. A yieldable presser bar 68 is provided on the table 6 in position to engage the opposite longitudinal edges of the boards and to keep them in engagement with the guide strip 67 to further insure traveling of the boards in a straight path and against relative displacement while being fed through the machine.

In using the machine, the operator simply keeps the hopper 7 filled with boards and places the drive shaft 43 into operation. When shaft 43 is driven, rotation is imparted to shafts 16 and 42 so as to operate cams 17, 58 and 36. The lowermost board in hopper 7 is then engaged by element 51 and fed from the hopper into position for being operated upon the cutter bit 11. The board is then allowed to remain stationary for a predetermined period of time due to the raised portion of cam 58 which is concentric with its axis or shaft 16. At this time, cam 17 elevates cutter bit 11 so as to feed it through the board for the initial formation of a round hole therein, it being of course understood that the means for rotating the cutter bits 11 and 27 has been previously placed into operation. As soon as the cutter bit 11 completes the circular hole in the board, the part 62 of cam 58 will become operative so as to give to the board a final feeding movement relative to cutter bit 11 while it is maintained elevated through the medium of the large portion of cam 17 which is concentric with shaft 16. In this way the hole in the board is elongated to a length depending upon the character of the raised portion 62 of cam 58. The board-engaging element 51 is then quickly returned to the start of its board feeding movement, being released for return by spring 64, because of roller 61 leaving the high part of cam 58. At this same time, the high part of cam 17 moves away from roller 20 so as to allow cutter bit 11 to lower below the board and the table 6. Board-engaging element 51 then engages and moves the succeeding board from the hopper into position for being operated upon by cutter bit 11, the previous board being fed along into position to be operated upon further by cutter bit 27, due to engagement of the first board with the edge of the succeeding board. As the bit 11 is again actuated for entering the second board, the cam 36 permits bit 27 to simultaneously lower into engagement with the first board so that both boards will be simultaneously operated upon by the bits 11 and 27 upon the further feeding movement of the boards relative to the bits. When the final feeding movement of the boards is completed, cam 36 will operate to elevate cutter bit 27 when cam 17 permits lowering of cutter bit 11, whereby the board just operated upon by bit 27 may be discharged from the machine simultaneously with feeding of the second board from bit 11 to bit 27, and with feeding of a new board into position for being operated upon by bit 11. This operation is continued in the cycles described as long as desired, it simply being necessary to keep the hopper 7 filled with boards to be slotted.

It will be seen that the machine is very efficient and positive in action, and requires little attention because of being automatic as long as a supply of boards is maintained within the hopper.

It will of course be understood that the invention is susceptible to various changes in the form, proportion, and arrangement of parts specifically herein illustrated and described. Accordingly, minor changes in the structural details disclosed herein by way of example, are contemplated within the spirit and scope of the invention as claimed. The vertical adjustment of clamping sleeve 32 effects similar adjustment of cutter bit 27 relative to table 6 to accommodate boards of different thickness.

What I claim as new is:

1. In a board slotting machine, a table, means for feeding boards successively along said table with initial and final feeding movements separated by an interval of rest, a rotary cutter bit, and means for feeding said rotary cutter bit for automatically cutting a circular hole in the successive boards during the periods of rest and for elongating such holes during the final feeding movements.

2. In a board slotting machine, a table, means for feeding boards successively along said table with initial and final feeding movements separated by an interval of rest, a rotary cutter bit, and means for feeding said rotary cutter bit for automatically cutting a circular hole in the successive boards during the periods of rest and for elongating such holes during the final feeding movements, said feeding means being adjustable to vary the extent of movement of the boards during the initial feeding movements.

3. In a board slotting machine, a table, means for feeding boards successively along said table with initial and final feeding movements separated by an interval of rest, a rotary cutter bit, and means for feeding said rotary cutter bit for automatically cutting a circular hole in the successive boards during the periods of rest and for elongating such holes during the final feeding movements, said feeding means being adjustable to vary the extent of movement of said boards during the final feeding movements.

4. In a board slotting machine, a table, means for feeding boards successively along said table with initial and final feeding movements separated by an interval of rest, a rotary cutter bit, means for feeding said rotary cutter bit for automatically cutting a circular hole in the successive boards during the periods of rest and for elongating such holes during the final feeding movements, said feeding means being adjustable to vary the extent of movement of the boards during the initial feeding movements, and means to adjust said last-named feeding means to vary the distance at which the boards are moved during the final feeding movements.

5. In a board slotting machine, a table, means for feeding boards successively along said table with initial and final feeding movements separated by an interval of rest, a rotary cutter bit, and means for feeding said rotary cutter bit for automatically cutting a circular hole in the successive boards during the periods of rest and for elongating such holes during the final feeding movements, said feeding means including an actuating cam having a detachable portion controlling the final feeding movements of the boards, whereby detachable portions of various forms may be interchangeably employed on the cam to vary the distance at which the boards are moved during the final feeding movements.

6. In a board slotting machine, a table, means for feeding boards successively along said table with initial and final feeding movements separated by an interval of rest, a rotary cutter bit, means for feeding said rotary cutter bit for automatically cutting a circular hole in the successive boards during the periods of rest and for elongating such holes to form slots during the final feeding movements, another rotary cutter bit, and means for feeding the latter cutter bit for automatically rounding the upper corner of the slot in each board during such final feeding movement of the next succeeding board.

7. In a board slotting machine, a table, means for feeding boards successively along said table with initial and final feeding movements separated by an interval of rest, a rotary cutter bit, means for feeding said rotary cutter bit for automatically cutting a circular hole in the successive boards during the periods of rest and for elongating such holes to form slots during the final feeding movements, said feeding means being adjustable to vary the extent of movement of the boards during the initial feeding movements, another rotary cutter bit, and means for feeding the latter cutter bit for automatically rounding the upper corner of the slot in each board during such final feeding movement of the next succeeding board, said last-named cutter bit being adjustable to various distances from the first-named cutter bit.

8. In a board slotting machine, a table, means for feeding boards successively along said table with initial and final feeding movements separated by an interval of rest, a rotary cutter bit, means for feeding said rotary cutter bit for automatically cutting a circular hole in the successive boards during the periods of rest and for elongating such holes to form slots during the final feeding movements, said feeding means being adjustable to vary the extent of movement of said boards during the final feeding movements, another rotary cutter bit, and means for feeding the latter cutter bit for automatically rounding the upper corner of the slot in each board during such final feeding movement of the next succeeding board, said last-named cutter bit being adjustable to various distances from the first-named cutter bit.

9. In a board slotting machine, a table, means for feeding boards successively along said table with initial and final feeding movements separated by an interval of rest, a rotary cutter bit, means for feeding said rotary cutter bit for automatically cutting a circular hole in the successive boards during the periods of rest and for elongating such holes to form slots during the final feeding movements, said feeding means being adjustable to vary the extent of movement of the boards during the initial feeding movements, and to vary the distance at which the boards are moved during the final feeding movements, another rotary cutter bit, and means for feeding the latter cutter bit for automatically rounding the upper corner of the slot in each board during such final feeding movement of the next succeeding board, said last-named cutter bit being adjustable to various distances from the first-named cutter bit.

10. In a board slotting machine, a table provided with an opening, a vertical power driven shaft mounted for vertical reciprocation beneath the table and carrying a cutter bit at its upper end in position to move through said opening, mechanism for successively feeding boards along said table with initial and final feeding movements separated by a period of rest, and means to automatically elevate said shaft and cutter bit for forming circular holes in the boards during such periods of rest, for maintaining the shaft and cutter bit elevated during the final feeding movements so as to cause the holes in the boards to be elongated by the cutter bit, and to permit the shaft and cutter bit to lower out of the path of the boards during such initial feeding movements so as to permit positioning of a new board in operative relation to the cutter bit and discharge of the board previously operated from operative relation to said cutter bit.

11. In a board slotting machine, a table provided with an opening, a vertical power driven shaft mounted for vertical reciprocation beneath the table and carrying a cutter bit at its upper end in position to move through said opening, mechanism for successively feeding boards along said table with initial and final feeding movements separated by a period of rest, means to automatically elevate said shaft and cutter bit for forming circular holes in the boards during such periods of rest, for maintaining the shaft and cutter bit elevated during the final feeding movements so as to cause the holes in the boards to be elongated by the cutter bit, and to permit the shaft and cutter bit to lower out of the path of the boards during such initial feeding movements so as to permit positioning of a new board in operative relation to the cutter bit and discharge of the board previously operated from operative relation to said cutter bit, a further power driven vertical shaft mounted for vertical sliding movement above the table and having a cutter bit at its lower end, and means to automatically elevate the second-named cutter bit out of the path of the boards during such initial feeding movements thereof and to permit lowering of the same into engagement with the boards for rounding the upper edge of the elongated hole formed in each board by the first-named cutter bit, respectively during such rest period and during such final feeding movement of the next succeeding board.

12. In a board slotting machine, a table provided with an opening, a vertical power driven shaft mounted for vertical reciprocation beneath the table and carrying a cutter bit at its upper end in position to move through said opening, mechanism for successively feeding boards along said table with initial and final feeding movements separated by a period of rest, means to automatically elevate said shaft and cutter bit for forming circular holes in the boards during such periods of rest, for maintaining the shaft and cutter bit elevated during the final feeding movements so as to cause the holes in the boards to be elongated by the cutter bit, and to permit the shaft and cutter bit to lower out of the path of the boards during such initial feeding movements so as to permit positioning of a new board in operative relation to the cutter bit and discharge of the board previously operated from operative relation to said cutter bit, a further power driven vertical shaft mounted for vertical sliding movement above the table and having a cutter bit at its lower end, means to automatically elevate the second-named cutter bit out of the path of the boards during such initial feeding movements thereof and to permit lowering of the same into engagement with the boards for rounding the upper edge of the elongated hole formed in each board by the first-named cutter bit, respectively during such rest period and during such final feeding movement of the next succeeding board, and means to vertically adjust said second-named cutter bit relative to the table for operation upon boards of varying thicknesses.

13. In a board slotting machine, a table provided with an opening, a vertical power driven shaft mounted for vertical reciprocation beneath the table and carrying a cutter bit at its upper end in position to move through said opening, mechanism for successively feeding boards along said table with initial and final feeding movements separated by a period of rest, means to automatically elevate said shaft and cutter bit for forming circular holes in the boards during such periods of rest, for maintaining the shaft and cutter bit elevated during the final feeding movements so as to cause the holes in the boards to be elongated by the cutter bit, and to permit the shaft and cutter bit to lower out of the path of the boards during such initial feeding movements so as to permit positioning of a new board in operative relation to the cutter bit and discharge of the board previously operated from operative relation to said cutter bit, a further power driven vertical shaft mounted for vertical sliding movement above the table and having a cutter bit at its lower end, means to automatically elevate the second-named cutter bit out of the path of the boards during such initial feeding movements thereof and to permit lowering of the same into engagement with the boards for rounding the upper edge of the elongated hole formed in each board by the first-named cutter bit, respectively, during such rest period and during such final feeding movement of the next succeeding board, means to facilitate adjustment of the board feeding means to vary the distance at which the boards are moved during the initial and final feeding movements thereof, and means to adjust the second-named cutter bit relative to the first-named cutter bit to vary the distance therebetween.

CHARLES H. TATE.